United States Patent [19]

Kohn

[11] Patent Number: 4,752,339
[45] Date of Patent: Jun. 21, 1988

[54] THIXOTROPIC AQUEOUS SOLUTIONS CONTAINING A DIVINYLSULFONE-CROSSLINKED POLYGALACTOMANNAN GUM

[75] Inventor: Rachel S. Kohn, Springfield, N.J.

[73] Assignee: Hi-Tek Polymers, Inc., Ga.

[21] Appl. No.: 547,145

[22] Filed: Oct. 31, 1983

[51] Int. Cl.$^4$ .............................................. C08L 5/00
[52] U.S. Cl. ............................... 106/208; 252/315.01; 252/315.3
[58] Field of Search ................... 252/315, 316, 315.01, 252/315.3; 106/209, 208

[56] References Cited

PUBLICATIONS

N. M. Young and M. A. Leon, Carbohydrate Research, vol. 66, 1978, pp. 299–302.

Primary Examiner—Amelia Burgess Yarbrough
Attorney, Agent, or Firm—Herbert P. Price

[57] ABSTRACT

This invention provides a process for preparing a viscoelastic aqueous solution which contains divinylsulfone-crosslinked polygalactomannan gum that is formed in situ.

An invention thixotropic aqueous medium is characterized by excellent heat/shear stability and high tolerance to the presence of inorganic salts.

A unique property of an invention thixotropic aqueous medium is a time-dependent gradual restoration of high viscosity after cessation of high shear deformation.

8 Claims, 4 Drawing Sheets

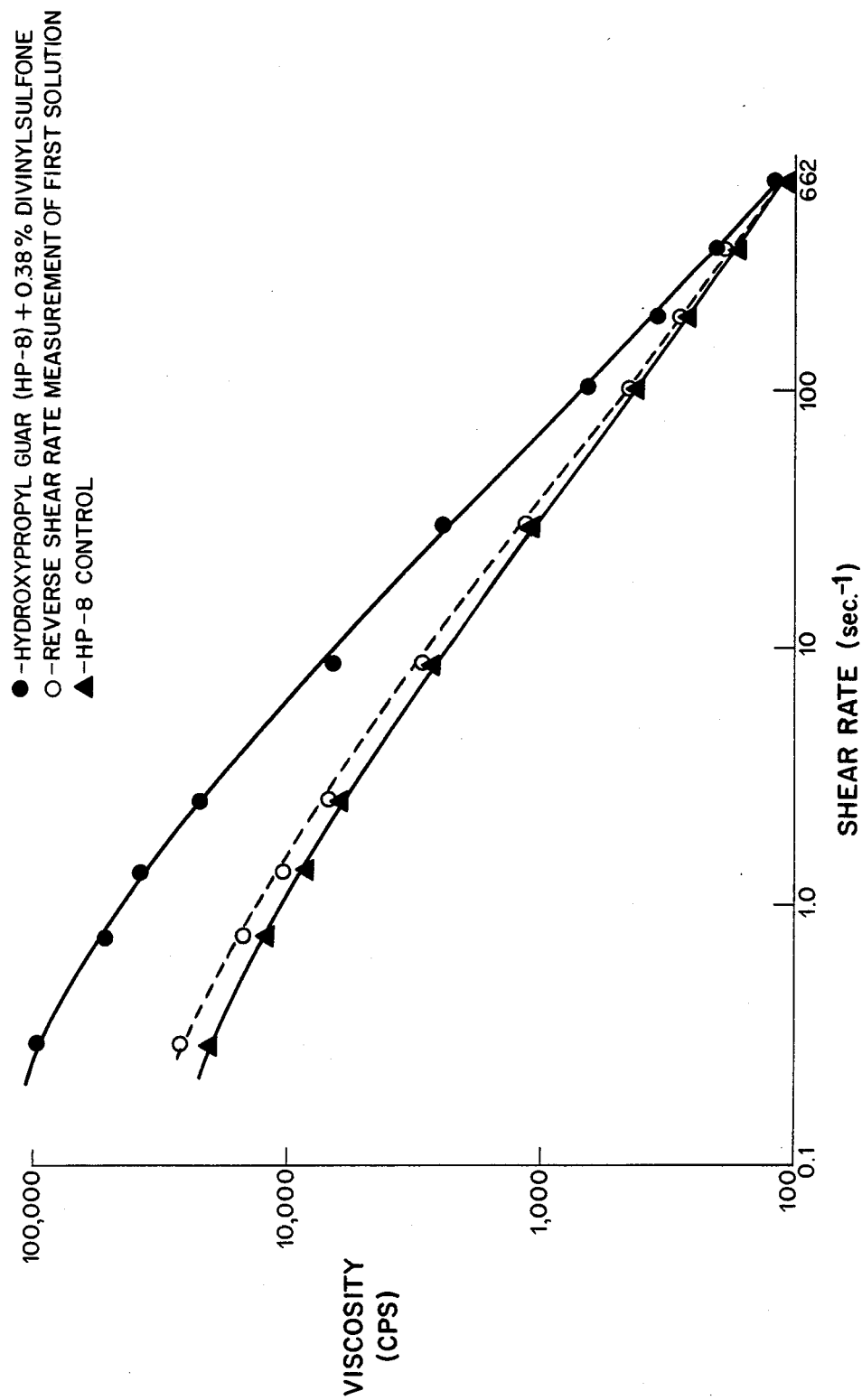

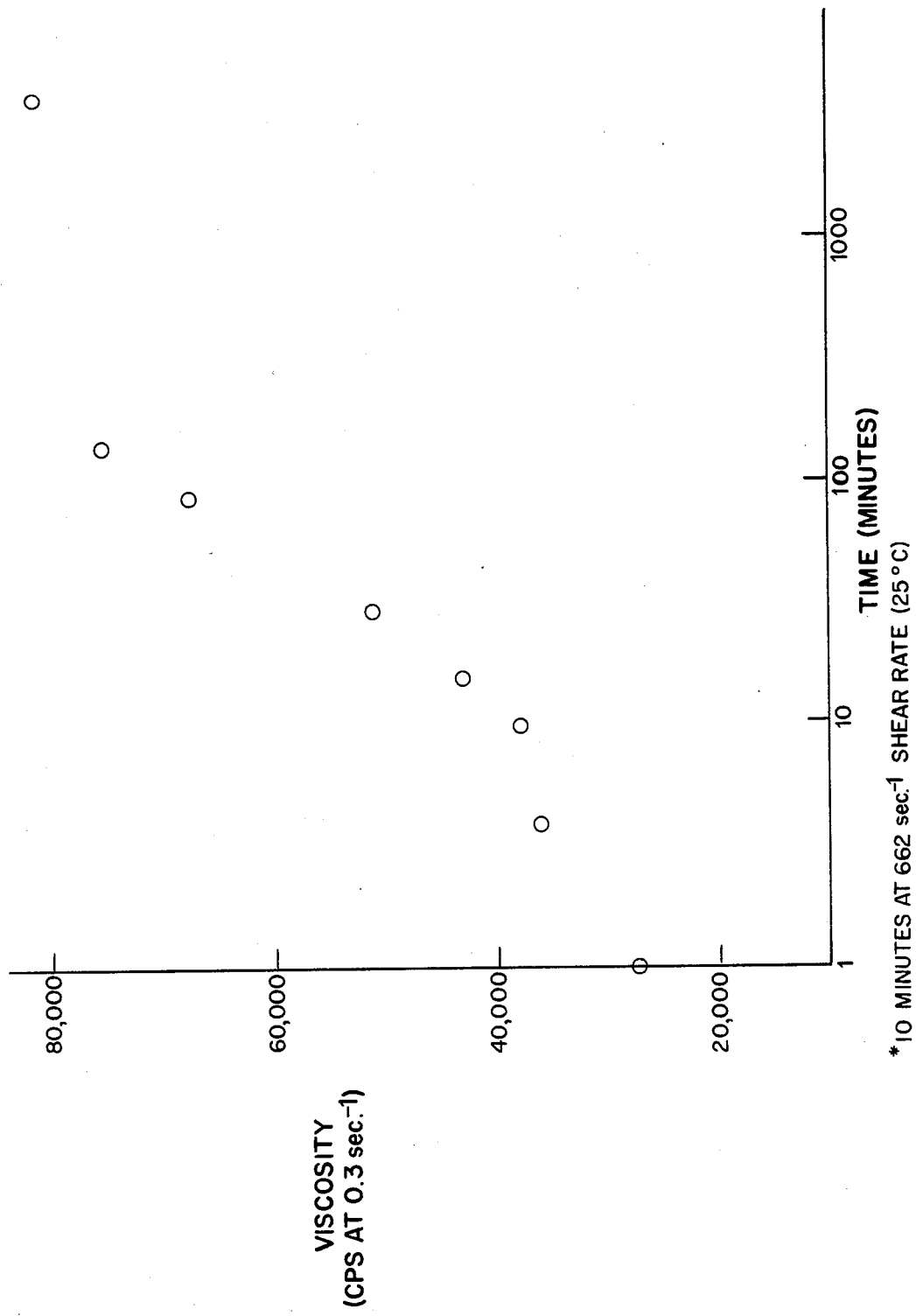

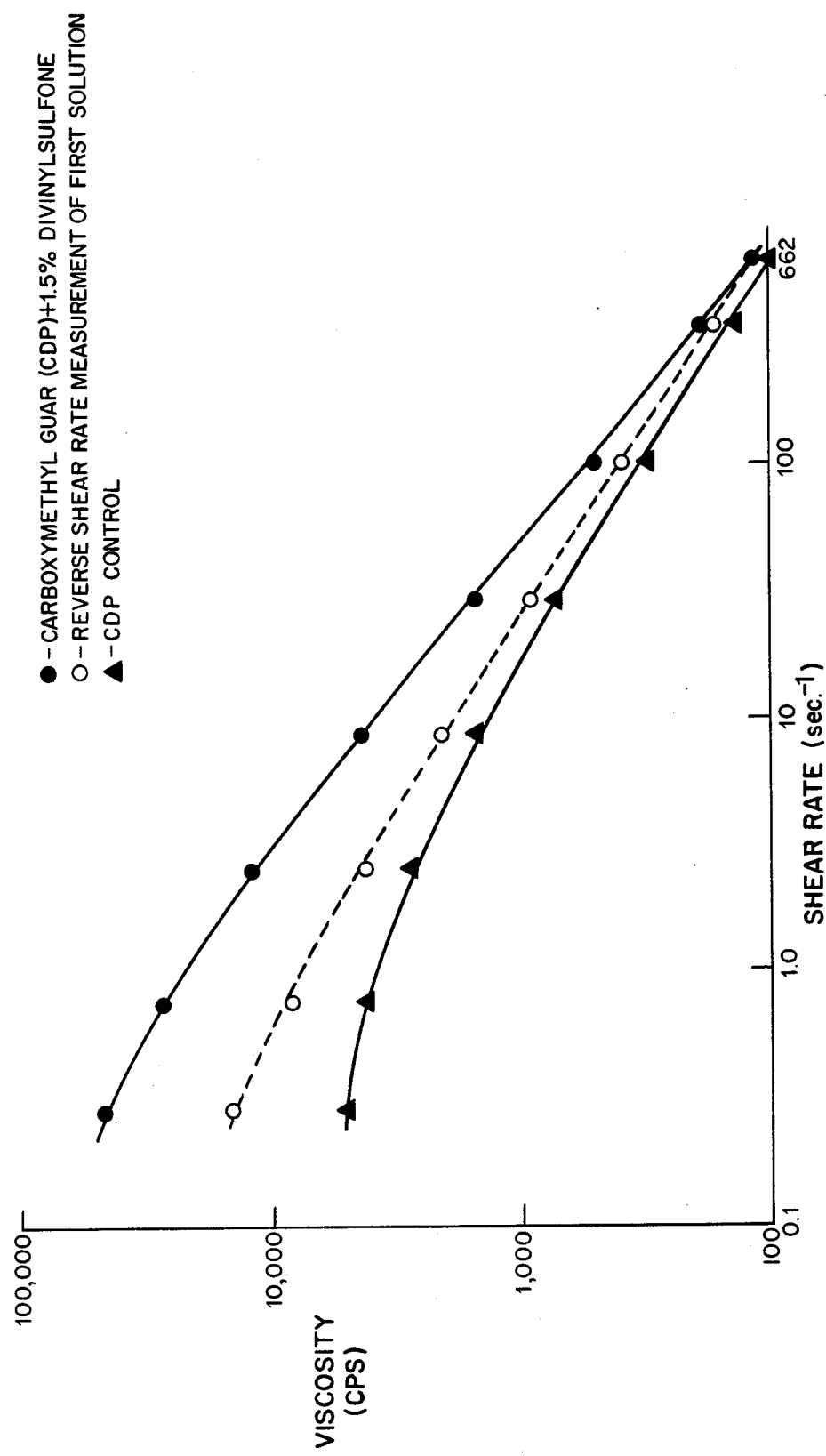

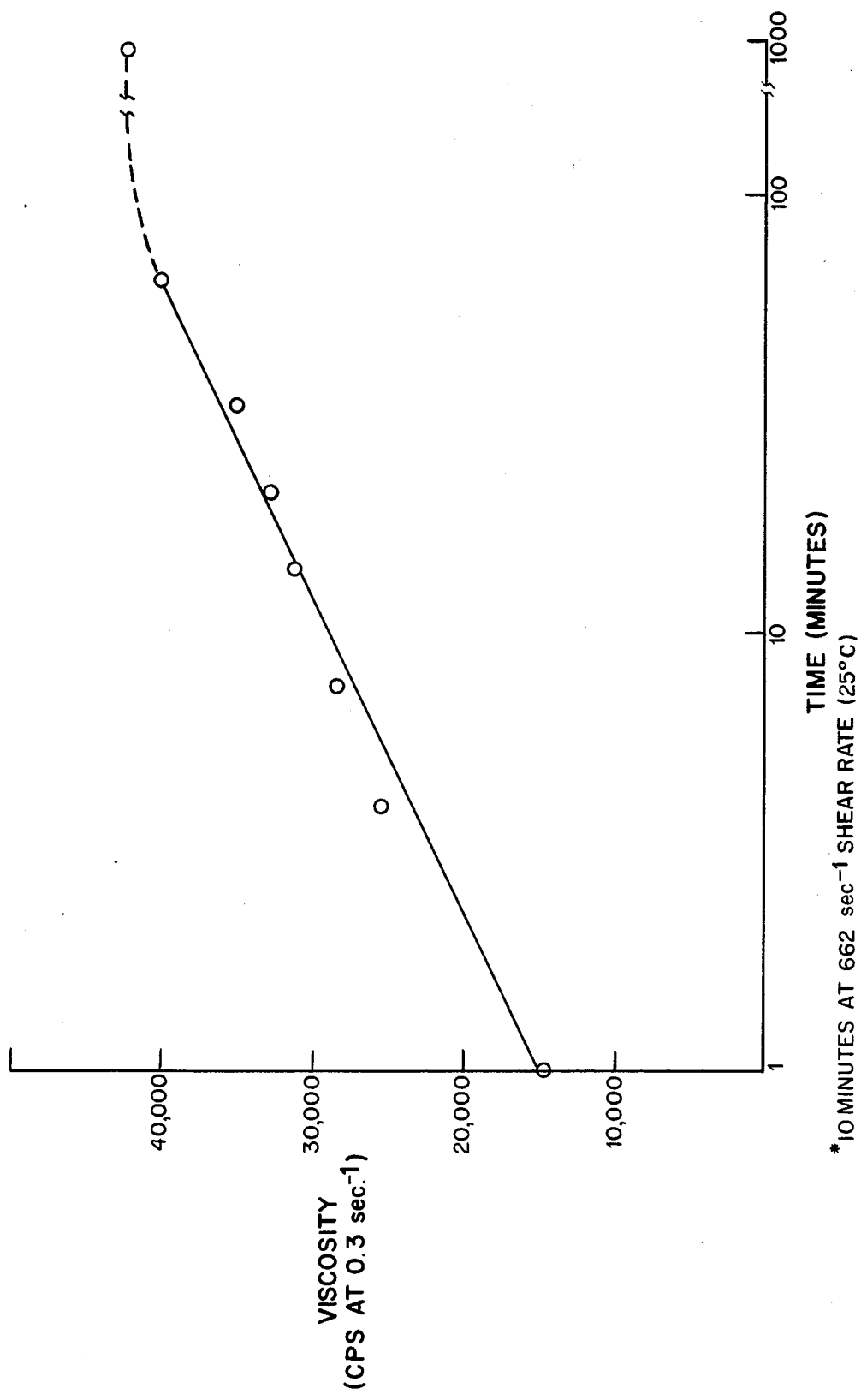

THIXOTROPIC AQUEOUS SOLUTIONS CONTAINING A DIVINYLSULFONE-CROSSLINKED POLYGALACTOMANNAN GUM

BACKGROUND OF THE INVENTION

Many liquid media possess a relative degree of elasticity and tensile strength, and are classified as viscoelastic materials. Some liquid media are characterized by pronounced elasticity and high tensile strength, and exhibit unique characteristics during laminar flow, i.e., they are superelastic liquids.

One characteristic of superelastic liquids is a tendancy to recoil when deforming forces acting on them are removed, and the potential energy stored in the liquids as a result of deforming forces is converted into kinetic energy. Another unique characteristic of superelastic liquid media is the ability to build up resistance to deformation as shear stresses increase and to flow readily at shear stresses about certain values.

It has been found that these and other properties qualify such liquid media as particularly useful for controlling lost circulation in oil field drilling operations and in related applications.

The superelastic liquids which have the greatest utility are those prepared by crosslinking water-soluble polymers in aqueous solution. It has been found that polysaccharidic hydrocolloids can be crosslinked in aqueous solution to produce viscous liquid media which are highly elastic and have considerable tensile strength.

U.S. Pat. No. 2,644,762 describes a water-dispersible dry blend mixture comprising locust bean gum, sodium borate and glyoxal or pyruvic aldehyde. The mixture is dispersed in cold water, and the dispersion is heated above 200° F. to produce a clear solution of high viscosity.

U.S. Pat. No. 2,968,581 describes a method of crosslinking polymeric polyhydroxy materials which involves reacting the said materials in the presence of water with a preformed polymeric acetal.

U.S. Pat. No. 3,214,235 describes the production of crosslinked derivatives of polyhydroxy compounds by reaction with a diester of propiolic acid.

U.S. Pat. No. 3,215,634 describes the preparation of superelastic liquids which involves reacting an aqueous solution of a polysaccharide with a crosslinking agent which yields borate ions in aqueous solution. An acyclic $C_2$-$C_5$ polyhydric alcohol is added in a concentration sufficient to react with excess borate ions and stabilize the crosslinked polysaccharide.

U.S. Pat. No. 3,297,583 describes a thickener composition readily dissolvable in water consisting of (1) a polyhydroxy polymer which has been pretreated in the dry state with an aldehyde under acidic conditions, and (2) an alkaline-acting component.

U.S. Pat. No. 3,697,498 describes a novel crosslinking agent for use with aqueous solutions of polysaccharides to form enhanced shear rate thinning viscoelastic solutions, wherein the said crosslinking agent consists essentially of a chelating composition formed from an organic polyelectrolyte ligand component, and a compound of a metal of the first series of the transition elements of the Periodic Table.

U.S. Pat. No. 3,836,465 describes a viscoelastic hydraulic fluid composition comprising an aqueous medium containing a mixture of polyalkylene oxide and lignosulfonate salt.

U.S. Pat. No. 4,183,765 describes a method of increasing the viscosity of a hydroxyalkyl cellulose solution by treatment with benzoquinone under controlled pH conditions.

Of more particular interest relative to the present invention, Carbohydrate Research, 66, 299 (1978) describes the preparation of affinity-chromatography media from polysaccharides by cross-linkage with divinylsulfone. The finely-divided solid products are derived by treating an alkaline solution of dextran or guaran with divinylsulfone, followed by grinding and dehydrating of the gel substrate that precipitates.

The use of divinyl sulfone to render cellulosic textile fabric crease-resistant is described in U.S. Pat. Nos. 3,068,123 and 3,281,204.

The various non-Newtonian viscoelastic solutions of the type reviewed above usually are characterized by one or more disadvantages which limit their applicability in important commercial operations, e.g., for use as hydraulic fluid vehicles in well-drilling and in secondary oil and gas recovery from subterranean formations.

One disadvantage is that some high viscosity solutions are not sufficiently thixotropic in relation to low and high shear rates.

Another disadvantage is that with some methods of thickening aqueous solutions there is not sufficient control over the attainment and maintenance of the desired viscosity range and properties.

Another disadvantage is that with some methods of thickening aqueous solutions it is necessary as a subsequent procedure to add a pH control reagent to an aqueous solution treated with a thickening agent, to effect the desired rate of formation and degree of viscoelastic properties in the aqueous solution.

Another disadvantage of some viscoelastic solutions is an intolerance to the presence of inorganic electrolytes.

A further disadvantage of some viscoelastic solutions is a sensitivity to temperatures above about 60° C., and a consequential degradation of rheological properties.

Accordingly, it is an object of this invention to provide a novel thickening agent adapted to impart thixotropic properties to an aqueous medium without a need for subsequent adjustment of pH conditions.

It is another object of this invention to provide a process for imparting viscoelastic properties to an aqueous medium.

It is a further object of this invention to provide a thixotropic aqueous solution which exhibits improved heat stability and tolerance to the presence of inorganic electrolytes.

Other objects and advantages of the present invention shall become apparent from the accompanying description and example.

DESCRIPTION OF THE INVENTION

One or more objects of the present invention are accomplished by the provision of a process for preparing a thixotropic aqueous solution which comprises treating an aqueous medium with a thickening agent comprising (1) polygalactomannan gum, (2) between about 0.1–10 weight percent of divinylsulfone, based on the weight of polygalactomannan gum, and (3) a water-soluble basic reagent.

In another embodiment, this invention provides a process for producing a thixotropic aqueous solution containing divinylsulfone-crosslinked polygalactomannan gum which comprises dissolving in an aqueous medium constituents comprising (1) polygalactomannan gum, (2) between about 0.1–10 weight percent of divinylsulfone, based on the weight of polygalactomannan gum, and (3) a water-soluble basic reagent; wherein the product thixotropic solution at a 1.0 weight percent content level of the polygalactomannan gum exhibits a viscosity of 10,000–120,000 centipoises at a shear rate of 0.3 reciprocal seconds, a viscosity of 300–10,000 centipoises at a shear rate of 5 reciprocal seconds, and a viscosity of 50–300 centipoises at a shear rate of 500 reciprocal seconds, and wherein the solution has the ability to recover the lowshear high-viscosity state over an elapsed time period.

In a further embodiment, this invention provides a thixotropic aqueous solution containing a thickening agent comprising divinylsulfone-crosslinked polygalactomannan gum. The divinylsulfone-crosslinked polygalactomannan gum preferably is provided at a relatively low level in the aqueous solution, e.g., a quantity between about 0.01–0.5 weight percent, based on the weight of the aqueous medium, to impart useful thixotropic characteristics to the aqueous medium. As the quantity of divinylsulfone-crosslinked polygalactomannan gum present in an aqueous solution increases, the viscosity of the aqueous solution increases toward soft gel and then hard gel consistency.

Whenever the following description refers specifically to guar gum, it is understood that the disclosure is applicable to corresponding closely related polygalactomannan gums in general, and locust bean gum in particular.

The term "polygalactomannan gum" as employed herein is meant to include derivatives of polygalactomannan gum in general, and ether derivatives of polygalactomannan gum in particular. Illustrative of ether derivatives are hydroxyalkyl derivatives and carboxyalkyl derivatives of polygalactomannan gum having a degree of substitution (D.S.) or molar substitution (M.S.) between about 0.1–1.5.

By the term "degree of substitution" as employed herein is meant the average substitution of groups (e.g., ether groups) per anhydro sugar unit in the polygalactomannan gums. In guar gum, the polymer consists of a chain of mannose units with a beta-1,4-glycosidic linkage, and a galactose unit is attached to a hydroxyl group of a mannose unit by an alpha-1,6 linkage, in a ratio of about one galactose unit per two mannose units. On the average, each of the anhydro sugar units contains three available hydroxyl sites. A degree of substitution of three would mean that all of the available hydroxy sites have been substituted with ether groups.

Preferred types of polygalactomannan gums for application as a component of the invention thickening compositions include guar gum and locust bean gum. Other preferred types of polygalactomannan gums are the hydroxyalkyl ether and carboxyalkyl ether derivatives which have a degree of substitution between about 0.1 and 1.5, and which have an alkyl group containing between 1 and about 6 carbon atoms, e.g., hydroxyethyl ether and carboxymethyl ether derivatives of guar gum.

Etherification of polygalactomannan gums can be accomplished with polygalactomannan gums in the form of finely divided powders or in the form of gum "splits".

Guar gum and other polygalactomannan hydrocolloids are derived from certain seeds of the plant family "leguminosae". The seeds are composed of a pair of tough, non-brittle endosperm sections referred to as "splits", between which is sandwiched a brittle embryo layer. The entire structure is enclosed in a tough seed coat.

The endosperm splits are extremely tough and non-brittle. This renders them difficult to reduce into a finely divided state. One method of separating the endosperm splits is described in U.S. Pat. No. 3,132,681. Methods of reducing endosperm splits into finely divided powder are described in U.S. Pat. Nos. 2,891,050; 3,455,899; and references cited therein.

Hydroxyalkyl ethers of polygalactomannan gums are readily prepared by the reaction of a polygalactomannan gum with an alkylene oxide containing between 1 and about 6 carbon atoms, e.g., ethylene oxide, propylene oxide, butylene oxide, hexylene oxide and the like.

The reaction of a polygalactomannan gum and an alkylene oxide is conveniently conducted at a temperature between about 20° C. and 100° C. and a pressure between about 15 and 150 psi, in a solvent medium in the presence of an alkaline catalyst such as sodium hydroxide or calcium hydroxide. Suitable solvent media include water, cyclic and acyclic alkyl ethers, alkanones, hydrocarbons, dialkylformamide, and the like, and mixtures thereof. Illustrative of useful organic solvents are pentane, acetone, methylethylketone, diethylketone, tetrahydrofuran, dioxane and dimethylformamide.

Employing similar conditions as recited above, carboxyalkyl ether derivatives are prepared by the reaction of a polygalactomannan gum with a monochloroalkanoic acid in a strongly alkaline medium, e.g., the reaction of chloroacetic acid with guar gum yields carboxymethyl ether of guar gum.

An essential aspect of an invention thickening agent is the presence of a water-soluble basic reagent. The term "basic" as employed herein in reference to a chemical reagent means a compound which contributes alkalinity to an aqueous medium, i.e., its presence provides hydroxyl ions in an aqueous solution.

The quantity of water-soluble basic reagent incorporated in a present invention aqueous solution can be varied over a broad range (e.g., between about 0.001–10 weight percent of the composition), depending on related factors. An important consideration is the establishment of an alkaline pH in the aqueous medium being treated with an invention thickening agent. An aqueous medium pH in the range between about 7–10 is advantageous during the time period that polygalactomannan gum and divinylsulfone are being dispersed and dissolved in the aqueous medium. If the pH of the aqueous medium is not alkaline, then little or no crosslinking interaction between polygalactomannan gum and divinylsulfone occurs.

Suitable basic reagents include inorganic compounds which are sufficiently water-soluble to impart alkalinity to an aqueous solution. Illustrative of basic reagents are alkali metal and alkaline earth metal inorganic salts and hydroxides such as carbonates, phosphates and hydroxides of sodium, potassium, lithium and magnesium metals.

A thixotropic aqueous solution can be prepared by the simple expediency of adding the essential constituents to an aqueous medium. The dispersion and dissolution of the added constituents can be facilitated by warming and stirring of the aqueous medium.

A thickened aqueous solution prepared in accordance with a present invention process embodiment has unique viscoelastic properties which appear to be attributable to a low degree of crosslinking effected between polygalactomannan gum molecules by reaction with divinylsulfone via a Michael-type addition mechanism under alkaline conditions:

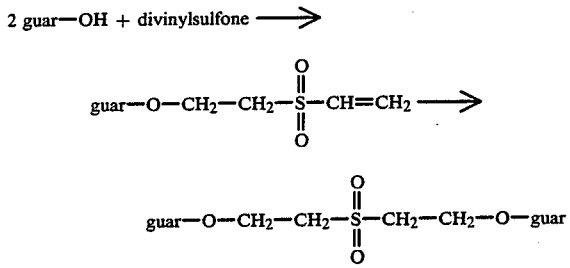

As noted previously, the reaction between polygalactomannan gum and divinylsulfone is pH sensitive. The pH must be at least about 6.0, and the pH is preferably in the alkaline range between about 7-10, and most preferably is at least about 7.5.

The polygalactomannan gum and divinylsulfone being reacted to form the desired divinylsulfone-crosslinked polygalactomannan gum are employed in quantities between about 0.1-2 weight percent of polygalactomannan gum, based on the weight of aqueous medium, and between about 0.1-10 weight percent of divinylsulfone, based on the weight of polygalactomannan gum.

Under aqueous alkaline conditions, the reaction between polygalactomannan gum and divinylsulfone proceeds readily at room temperature to form the divinylsulfone-modified polygalactomannan gum, i.e., polygalactomannan gum with a low degree of divinylsulfonecrosslinking between polygalactomannan gum molecules. It is believed that there is also present an annular type of macromolecule which is formed by a difunctional Michael addition between one polygalactomannan gum molecule and one divinylsulfone molecule.

An aqueous solution containing 1.0 weight percent polygalactomannan gum, and 1-3 weight percent divinylsulfone based on gum weight, will have a viscosity of about 10,000-100,000 centipoises higher than an aqueous solution which contains 1.0 weight percent of the corresponding polygalactomannan gum not crosslinked with divinylsulfone.

An aqueous medium (e.g., a hydraulic fluid) which is thickened with a divinylsulfone-modified polygalactomannan gum provided by an invention thickening agent exhibits unique viscoelastic properties not previously evident in known aqueous media thickened with a polygalactomannan gum either alone or in combination with other organic or inorganic gelling ingredients.

A high viscosity aqueous solution provided by the present invention is thixotropic, heat stable at temperatures up to about 80° C., and exhibits a high degree of tolerance for the presence of inorganic electrolytes such as sodium chloride.

There is a significant distinction between the thixotropic nature of a present invention viscoelastic aqueous solution and that of a conventional viscoelastic aqueous medium. An invention thixotropic solution does not regain its original high viscosity upon diminution of high shear deformation as does a control solution thickened with guar gum. Instead, the viscosity of the invention solution remains at a low level after a half hour even at a shear rate as low as 0.3 reciprocal seconds.

An invention thickened solution upon relaxation after high shear stirring slowly and continuously regains its original high viscosity as a function of time. This exceptional property of an invention viscoelastic aqueous solution is highly advantageous for purposes of transport through an extensive conduit system.

The following Example is further illustrative of the present invention. The catalysts and other specific ingredients and processing parameters are presented as being typical, and various modifications can be derived in view of the foregoing disclosure within the scope of the invention.

EXAMPLE

This Example illustrates the preparation of thixotropic aqueous solutions of polygalactomannan gums which are crosslinked with divinylsulfone.

To 300 grams of a 1% aqueous solution of guar gum is added 3 milliliters of a 1% aqueous solution of divinylsulfone, and 0.45 milliliters of 5N sodium hydroxide. After a short period of stirring and warming, the resultant solution exhibits viscoelastic liquid properties. Similar viscosity properties are observed when locust bean gum is crosslinked with divinyl sulfone.

In a similar manner, thickened aqueous solutions are prepared by inclusion of either hydroxypropyl guar or carboxymethyl guar crosslinked with divinylsulfone under alkaline conditions. The data summarized in the Table demonstrate the heat/shear stability of divinylsulfonecrosslinked guar derivative solutions in comparison with control solutions of guar derivatives.

FIG. 1 illustrates the superelastic properties of hydroxypropyl guar (HP-8) which is crosslinked with 0.38% of divinylsulfone. The second curve in the FIG. 1 graph represents the reverse direction shear rate measurement of the first solution, with the 662 sec$^{-1}$ shear rate being the starting point for the down scale series of shear rate measurements.

FIG. 2 is a graph of viscosity measurements of a FIG. 1 type solution in a relaxation mode, after 10 minutes of shearing at a 662 sec$^{-1}$ shear rate at room temperature.

FIG. 3 corresponds to FIG. 1 and FIG. 4 corresponds to FIG. 2 in graphic representation, except that the gum derivative is carboxymethyl guar instead of hydroxypropyl guar. Similar results are observed when the hydrocolloids utilized are the corresponding locust bean gum derivatives.

TABLE

HEAT/SHEAR STABILITY OF DIVINYLSULFONE-TREATED 1% GUAR DERIVATIVE SOLUTIONS

| | VISCOSITY (CPS AT 0.3 SEC$^{-1}$) | |
|---|---|---|
| | INITIAL[4] | FINAL[5] |
| HP-8[1] | 21,000 | 19,000 |
| HP-8 + 0.38% DVS[2] | 110,000 | 99,000 |
| CDP[3] | 5,100 | 2,900 |
| CDP + 1% DVS | 15,000 | 15,000 |
| CDP + 1.5% DVS | 60,000 | 53,000 |

[1]Hydroxypropyl guar (Celanese); M.S. of 0.4.
[2]Divinylsulfone, based on weight of gum.
[3]Carboxymethyl guar (Celanese); D.S. of 0.17-0.2.
[4]Viscosity after reaction with DVS; pH 9-10.
[5]Viscosity after swirl shaking at 200 rpm for 16 hours (60° C.).

I claim:

1. A process for producing a thixotropic aqueous solution containing water-soluble divinylsulfone-crosslinked polygalactomannan gum which comprises dissolving in an aqueous medium constituents comprising (1) polygalactomannan gum, (2) between about 0.1–10 weight percent of divinylsulfone, based on the weight of polygalactomannan gum, and (3) a water-soluble basic reagent; wherein the product thixotropic solution at a 1.0 weight percent content level of the polygalactomannan gum exhibits a viscosity of 10,000–120,000 centipoises at a shear rate of 0.3 reciprocal seconds, a viscosity of 300–10,000 centipoises at a shear rate of 5 reciprocal seconds, and a viscosity of 50–300 centipoises at a shear rate of 500 reciprocal seconds, and wherein the solution has the ability to recover the low-shear high-viscosity state over an elapsed time period.

2. A process in accordance with claim 1 wherein the polygalactomannan gum is guar gum or an ether derivative of guar gum.

3. A process in accordance with claim 1 wherein the polygalactomannan gum is locust bean gum or an ether derivative of locust bean gum.

4. A process in accordance with claim 1 wherein the basic reagent is an inorganic salt.

5. A process in accordance with claim 1 wherein the basic reagent is an alkali metal salt.

6. A process in accordance with claim 1 wherein the basic reagent is alkali metal hydroxide.

7. A process in accordance with claim 1 wherein the basic reagent is alkali metal carbonate.

8. A process in accordance with claim 1 wherein divinylsulfone crosslinking of polygalactomannan gum occurs in the aqueous solution at a pH above about 7.

* * * * *